United States Patent [19]

Conn

[11] Patent Number: 4,558,299

[45] Date of Patent: Dec. 10, 1985

[54] TURN-ON-RED TRAFFIC SIGNAL

[76] Inventor: Donald M. Conn, Rte. 728, Weems, Va. 22576

[21] Appl. No.: 554,870

[22] Filed: Nov. 25, 1983

[51] Int. Cl.⁴ .......... B60Q 1/46

[52] U.S. Cl. .......... 340/81 R; 340/84; 340/907

[58] Field of Search .......... 340/84, 81 R, 907, 931, 340/916; 116/63 R; 40/581

[56] References Cited

U.S. PATENT DOCUMENTS 2,219,092 10/1940 Hoover .......... 340/84

*Primary Examiner*—James L. Rowland
*Assistant Examiner*—Chi K. Lau
*Attorney, Agent, or Firm*—Dowell & Dowell

[57] ABSTRACT

A traffic light structure having a housing including a front portion; a colored lens mounted in the front portion and facing along a roadway to be controlled; a reflector in the housing behind the lens; a main lamp between the reflector and the lens; an electric power source in control of illumination of the main lamp to stop traffic when the main lamp is illuminated; a divider in the housing between the reflector and the lens and operative to divide the space therebetween into a major zone including said main lamp and a non-communicating minor zone of lesser size located offset from the center of the lens; an auxiliary light source in the minor zone and disposed when illuminated to illuminate the portion of the lens overlying the minor zone; and a blinker for intermittently flashing the light from the auxiliary ligh source when the main lamp is illuminated, the divider having an outer portion adjacent to the lens, and the shape of the outer portion of the divider determining the contour of the portion of the lens which is illuminated by the flashing auxiliary light source to indicate to traffic that a turn on red after stopping is permitted.

5 Claims, 6 Drawing Figures

TURN-ON-RED TRAFFIC SIGNAL

BACKGROUND AND PRIOR ART

This invention relates to improvements in traffic light signals operative to inform the driver of an on-coming vehicle that he is permitted to make a turn on red-signal after coming to a full stop at that intersection, and to inform him in which direction transversely of his present course he is permitted to make such a turn.

At the present time, turns to the right after making a full stop are permitted during a red stop light interval at most controlled intersections, but at each intersection the driver must carefully look to see if a "no turn on red" sign has been posted. These signs are hung in a confusing diversity of locations and are easily missed by drivers who already have many other traffic conditions to watch.

It is the purpose of this invention to eliminate the need for "no turn on red" signs, and eventally to have all intersections entirely controlled by stop lights in such a way that a continuous red light unequivocally means "stop and remain stopped", and it is the further purpose of the invention to have the lens indications on stop lights show permission to turn after a full stop where such turns are permissible, thereby eliminating the burden of requiring a motorist to find at his peril whether a "no turn on red" sign has been posted somewhere in the vicinity.

U.S. Pat. No. 2,219,092 to Z. L. Hoover seeks to accomplish a similar purpose by modifying sectors or segments of traffic light lens and/or selectively illuminating these sectors when a turn is permitted. The altered sectors are selectively illuminated in an unflashing manner at moments when the turn is permitted or left dark at moments when it is not permitted. This disclosure, therefore, is intended to replace the separate arrow light-signal pointing right or left, rather than to permit removal of "no turn on red" signs at those intersections where a turn on red is not permitted. In FIGS. 4, 5 and 6 of that patent where the main lens is red, a turn to one side or the other is signalled by selective illumination of a green insert in the lens when the lamp behind the insert is energized. The problem with this type of indication is that sharp vision is required to distinguish a small green insert in a larger red field, especially where overhead suspended lights are seen against a bright blue sky. The visual perception problem is aggravated not only by the smallness of the insert but also by the change of color. Many people whose vision is marginal drive vehicles, and therefore the traffic signals must be very clear and not easily mis-read by the motorist

THE INVENTION

The invention comprises an improvement in the type of traffic light structure having a housing including in front a colored lens facing along a roadway to be controlled, and the housing further containing a reflector behind the lens and a main stop lamp between the reflector and the lens connected to an externally located traffic controller, the structure indicating to on-coming traffic that it should stop when the stop lamp is illuminated. The inventive improvement provides the standard light structure with means for automatically indicating to on-coming traffic that it is permissible when the stop lamp is illuminated for a vehicle to turn after stopping and then proceed in a direction transverse to the roadway which is being controlled. For this purpose a partition is inserted in the housing and extends between the reflector and the lens to divide the space therebetween into a major zone including said main stop lamp and into a non-communicating minor zone of lesser size located offset from the center of the lens toward the direction in which a turn after stopping is permitted. An auxiliary source of light intermittently illuminates the minor zone, casting light upon the lens at a location offset on the other side of the partition from the main lamp. Blinker means, operative when the main lamp is illuminated, flashes the light from the auxiliary source. Therefore, a major zone of the lens is illuminated red continuously during the traffic-stopped interval, and a minor zone of the same lens is flashed red, intermittently on and off, during that same interval. The auxiliary source can be an electic lamp whose light is flashed by connecting it to the same power line as the main stop lamp through an electrical blinker unit, or a steady light can be chopped by rotating mechanical vanes. The minor zone within the housing can be variously shaped to define with the minor portion of the lens either a sector of the whole lens or some other shape, for instance, resembling an arrow head pointing in the direction in which a turn after stopping is permitted. The auxiliary light source can either be a lamp located between the reflector and the lens within the minor zone, or a light source which is coupled to the minor portion of the lens through light transmitting fibers.

OBJECTS AND ADVANTAGES OF THE INVENTION

It is a principal object of this invention to provide an improved traffic light structure which will show motorists that it is permissible to turn in an indicated direction after stopping at a red light, and will provide such indication in a manner which is unambiguous and which follows the usual convention that a flashing red light at an intersection means "stop and then proceed with caution". The purpose of the improvement is to eliminate the "no turn on red" signs which are hung in some intersections where turning is not permitted except on a green signal, these "no turn on red" signs being hung in so many diverse locations at intersections that they are often difficult to locate, and may therefore be missed by a motorist.

Another major object of the invention is to provide such an improved stop light structure which is very inexpensive to make and assemble to existing traffic lights. In particular, no change is necessitated in the lens itself; no new wiring would be added between the controller and the main red stop lamp; the existing reflector would only have to be modified by drilling or punching to accept a second offset socket for the auxiliary lamp; a simple partition would be added which would extend between the reflector and the lens; a flasher unit would be connected from the main lamp socket to the auxiliary lamp socket; and none of the present parts of a standard traffic light assembly would have to be thrown away. These changes are minor and would permit retro-fitting to be accomplished quickly during normal servicing of the structures and at a low enough cost as to make conversion to the improved traffic signal structure economical.

Other objects and advantages of the invention will become apparent during the following discussion of the drawings.

THE DRAWINGS

DESCRIPTION OF PREFERRED EMBODIMENT

Figure 1:
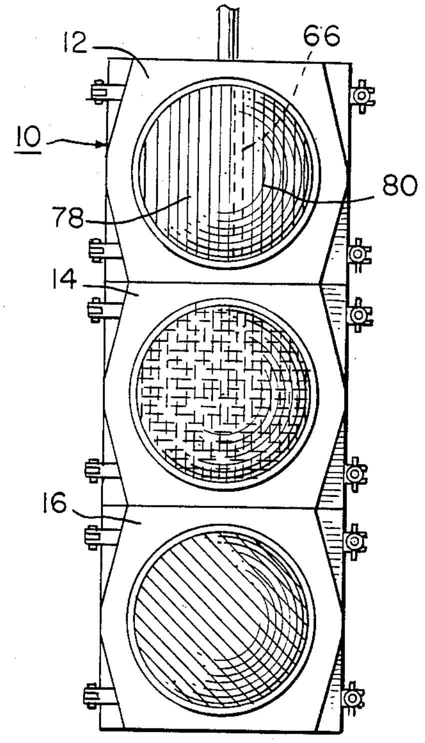
FIG. 1 is a front elevation view of a three-section traffic signal in which the uppermost section containing the red light has been altered to indicate that a turn to the right is permissible after stopping.

Referring now to the drawings, FIG. 1 shows a front view of a commercially available type of traffic signal housing 10 having three vertically stacked sections, including a top red-light section 12, a center yellow-light section 14 and a lower green-light section 16. The center and lower sections are not modified according to this embodiment, but the top red-light section 12 is modified to include the invention as shown in FIGS. 2, 3 and 4.

Figure 2:
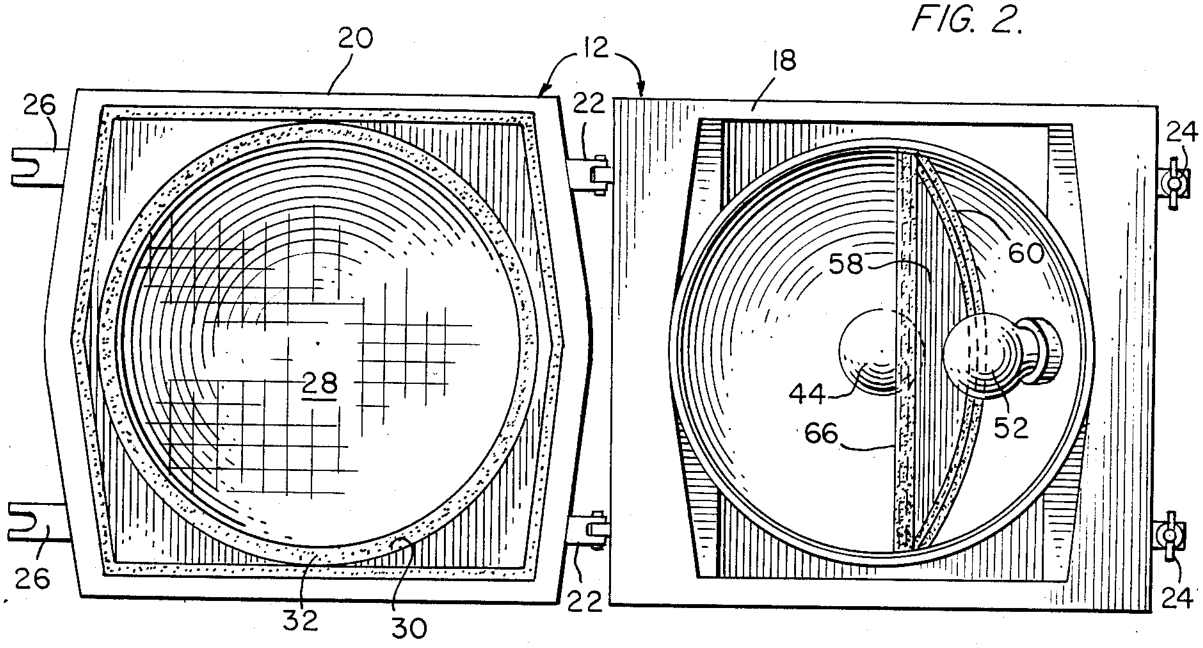
FIG. 2 is a front elevation view of the uppermost section of the traffic signal with the door opened to swing the lens to the left, FIG. 2 showing the reflector and partition and lamps arranged according to a preferred embodiment of the invention.
Figure 3:
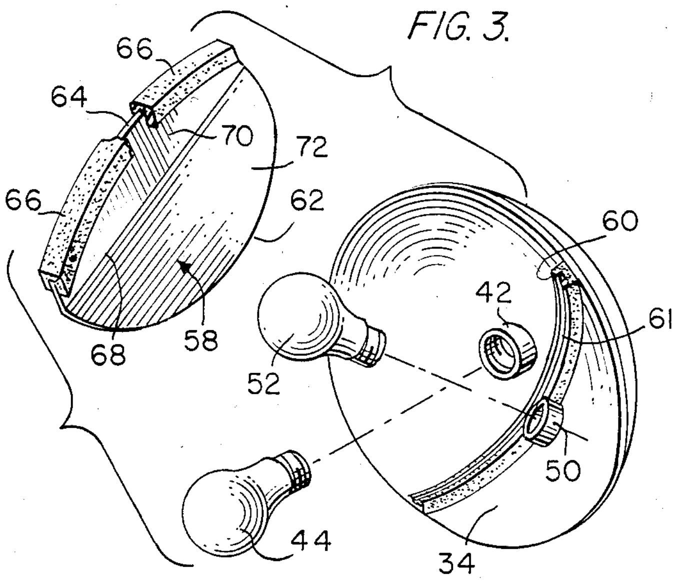
FIG. 3 is an exploded view of the modified uppermost section's reflector, partition and lamp assembly according to this invention.

FIG. 2 shows the top red-light section 12 with the front portion of the housing in the form of a door opened to make the interior of the housing and contents visible. The housing comprises a rear portion 18 supporting the front openable door portion 20 which is hinged to the rear portion 18 at the hinges 22, and when closed is held shut by wing nuts 24 engaged in the slots of lugs 26. The door portion 20 supports a red lens 28 in an aperture 30, a gasket 32 extending around the junction of the lens 28 with the door aperture 30 and sealing the assembly when the door is closed.

Figure 4:
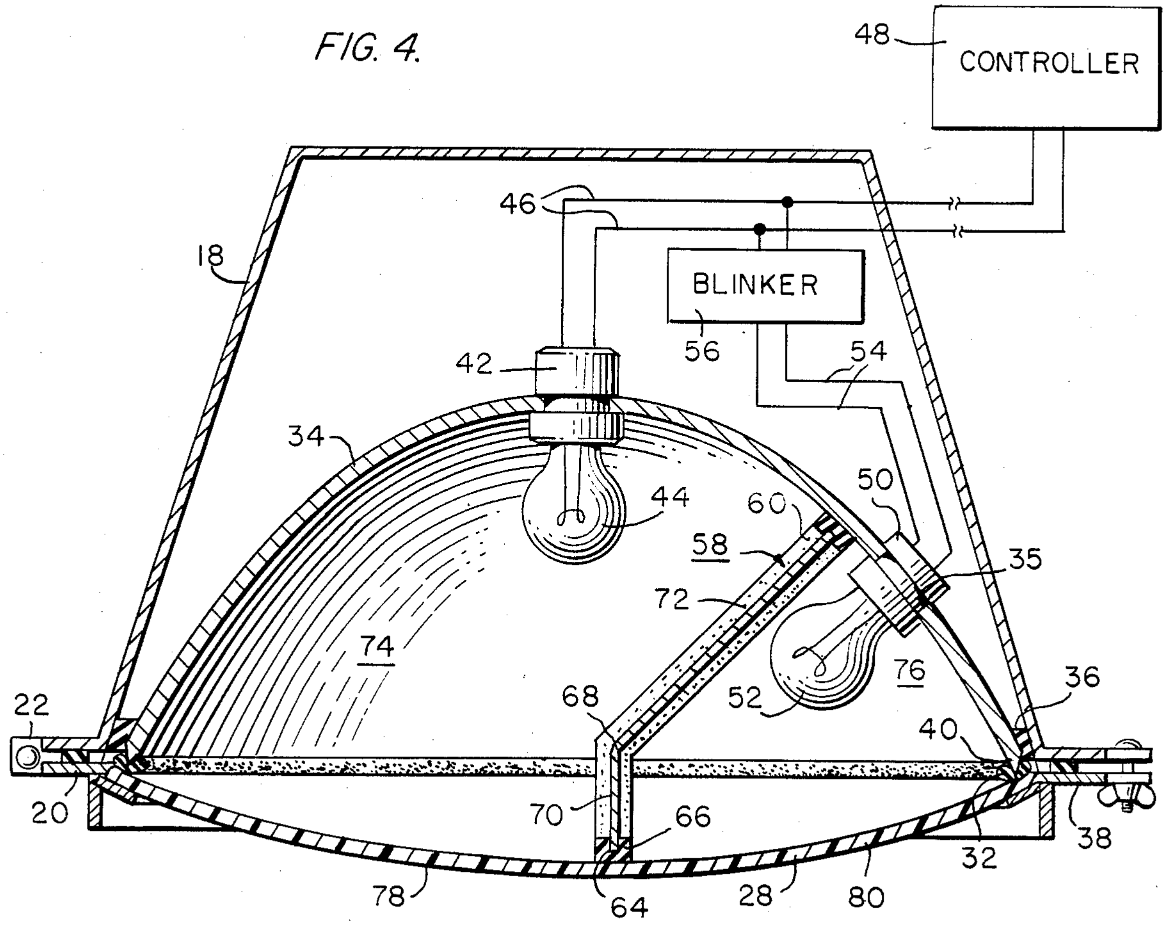
FIG. 4 is a horizontal sectional view taken through the uppermost section of the traffic signal and showing appropriate wiring from a signal controller.

The rear portion of the housing as seen in FIGS. 2 and 4 supports a reflector 34 mounted in a rubber gasket 36 engaging an opening in the front wall 38 of the housing which includes a raised annular rim 40 which compresses the gasket 32 when the door is closed. The reflector 34 is parabolic and supports a lamp socket 42 and lamp 44 which comprises the main stop lamp of the assembly, the main lamp being connected through electric power lines 46 to a remote traffic light controller 48 which controls the sequence of the traffic light intervals including a STOP interval when the main lamp 44 is illuminated.

The above discussed members are all parts of a standard traffic light assembly to which the present disclosure adds the following modifications comprising the present invention.

The reflector 34 is modified by providing an additional hole 35 therein which supports an auxiliary lamp socket 50 and auxiliary lamp 52, the wiring 54 from the auxiliary socket 50 being connected through a blinker unit 56 to the electric power lines 46 controlling the main lamp 44, the blinker being preferably located inside the housing 18 as shown in FIG. 4. Thus, the auxiliary lamp 52 flashes on and off in an occulting manner at a rate controlled by the blinker unit during those intervals when the main lamp is energized by the controller 48.

In addition the invention includes a divider in the form of a partition 58 having light reflective surfaces, the partition being inserted inside the reflector and secured thereto by some appropriate means, the details of which can be varied considerably. In the illustrative embodiment the partition 58 is compressed by the door 20 into a groove 61 in a resilient rubber strip 60 which is cemented to the reflector as shown in FIG. 3 and holds the partition in position. The partition could, however, be held in place by other means, and in fact might advantageously be formed integrally with the reflector. The partition 58 has an inner edge 62 which follows the contour of the reflector surface and lies in a groove 61 in the resilient strip 60, and the partition has an outer edge 64 which fits into the groove of a gasket 66 and is compressed therein by contact of the gasket 66 with the inner surface of the lens 28 as can be seen best in FIG. 4. The partition 58 has been bent along the line 68 so that the outer portion 70 of the partition 58 lies about at right angles to the inner surface of the lens, while the inner portion 72 of the partition lies about at right angles to the surface of the reflector where it approaches it.

Figure 5:
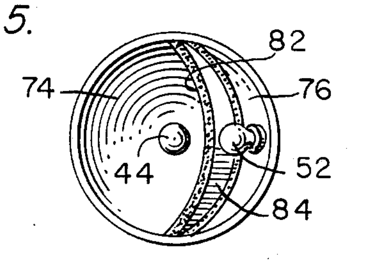
FIGS. 5 and 6 are front views of modified divider shapes for the purpose of making the flashing portion of the light resemble an arrow head.

When the door 20 is closed, the partition 58 is tightly held in place inside the assembly, dividing the space between the reflector 34 and the lens 28 into a larger major zone 74 containing the main stop lamp 44 and a smaller minor zone 76 containing the auxiliary lamp 52, which major and minor zones are non-communicating for light. The major portion 78 of the area of the lens overlies the major zone 74, and the minor portion 80 of the lens overlies the minor zone 76. However, the lens is all one piece being of red color for both its portions. The major and minor lens portions, being merely divided by the location of the partition 70 and gasket 66, and the shapes of the two differently illuminated portions of the lens as seen in FIGS. 1, 5 and 6 are determined entirely by the location and shape of the divider partition behind the lens.

The division of the lens area into a major portion 78 and a minor portion 80 as seen in FIG. 1 is a straight vertical line offset to the right, indicating when the minor portion 80 is flashing that traffic is permitted to turn right on red. However, it is to be understood that the partition 58 could be located offset to the left of center in FIG. 1 to provide an indication that a left turn on red is permitted when the resulting left minor portion of the lens shows a flashing light.

Moreover, the division between major and minor lens portions need not be a straight line, or vertical. For instance, as shown in FIG. 5 a partition 84 having an arcuate outer portion 82 contacting the lens would provide a curved line of division between the major zone 74 and the minor zone 76 of the lens, such division producing a sort of arrow head in the flashing zone of the lens.

Figure 6:
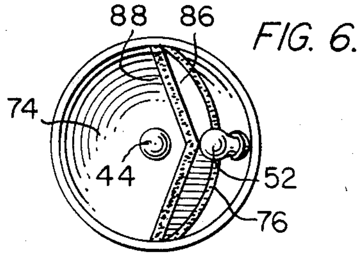

Alternatively, as shown in FIG. 6, a partition 86 having a dihedral contour providing a V-shaped outer edge 88 contacting the lens would provide a V-shaped line of division between the major zone 74 and the minor zone 76, again such division providing a flashing minor zone of the lens resembling an arrow head.

Other modified divisions between the major and minor portions of the lens to produce other shapes of flashing lens zones can be easily produced by appropriate shaping and location of the partition, for instance to indicate a permissible turn at an angle other than 90° with respect to the roadway being controlled.

This invention is not to be limited to the exact embodiments shown in the drawings and described, for variations within the scope of the following claims are contemplated.

I claim:

1. In a traffic light structure for selectively controlling the flow of traffic approaching along a roadway from one direction, the structure having a housing including a stop-light section supporting a unitary lens which is red in all areas and which has an inner surface, and the housing supporting a concave reflector having a reflecting surface facing toward said inner lens surface, and the housing supporting a main lamp in the reflector connected by wiring to a traffic controller, additional structure capable of quick and economical installation in said stop-light section and operative for indicating to traffic that it is permissible when the main lamp is illuminated to turn after stopping and proceed in a direction transverse to the roadway being controlled, comprising:

(a) a partition supported in the reflector and having inner edges shaped to continuously fit the contour of the reflecting surface and the partition having outer edges contoured to continuously fit the contour of the inner surface of the lens, and the partition including means to maintain it in a selected position against said reflecting and lens surfaces and being disposed to divide the space between the lens and the reflector into a major zone which includes within it said main lamp and a non-communicating minor zone of lesser size located offset from the center of the lens toward said direction in which a turn after stopping is permitted, and the outer edge of the partition contacting the lens and being shaped to determine the shape of a dividing line between the major and the minor zones of the lens;

(b) an auxiliary source of light located within the reflector on the opposite side of the partition from the main lamp and disposed behind the minor zone of the lens; and (c) means for intermittently flashing the auxiliary source of light behind the minor zone of the lens whenever the main lamp is illuminated.

2. A traffic light structure as claimed in claim 1, wherein the outer portion and outer edge of the partition where it approaches the lens are planar and vertically oriented.

3. A traffic light structure as claimed in claim 1, wherein the outer portion of the partition is dihedral and includes a V-shaped outer edge adjacent to the lens and defining therewith an arrow head pointing in the direction in which a turn after stopping is permitted.

4. A traffic light structure as claimed in claim 1, wherein the outer portion of the partition is arcuate and includes a curved outer edge adjacent to the lens and defining therewith a curved arrow head pointing in the direction in which a turn after stopping is permitted.

5. A traffic light structure as claimed in claim 1, wherein the auxiliary light source comprises an electric lamp within the minor zone between the reflector and the lens, and said means for flashing the light from the source comprises an electrical blinker connected between the auxiliary electric lamp and the controlled power lines to intermittently energize the electric lamp during periods when the main lamp is illuminated.

* * * * *